(12) United States Patent
Fan et al.

(10) Patent No.: US 7,898,800 B2
(45) Date of Patent: Mar. 1, 2011

(54) MOUNTING APPARATUS AND COMPUTER SYSTEM FOR PCI CARD

(75) Inventors: Chen-Lu Fan, Taipei Hsien (TW); Li-Ping Chen, Taipei Hsien (TW)

(73) Assignee: Hon Hai Precision Industry Co., Ltd., Tu-Cheng, Taupei Hsien (TW)

( * ) Notice: Subject to any disclaimer, the term of this patent is extended or adjusted under 35 U.S.C. 154(b) by 26 days.

(21) Appl. No.: 12/543,766

(22) Filed: Aug. 19, 2009

(65) Prior Publication Data

US 2010/0296242 A1 Nov. 25, 2010

(30) Foreign Application Priority Data

May 20, 2009 (CN) .......................... 2009 1 0302485

(51) Int. Cl.
*G06F 1/16* (2006.01)
(52) U.S. Cl. .............. 361/679.56; 360/97.02; 439/541.5; 235/492
(58) Field of Classification Search ............... 360/245.1, 360/97.01, 97.02, 94; 455/566, 550.1, 90.1; 235/441, 492; 353/15, 122; 439/74, 541.5; 361/679.08, 679.13, 679.14, 679.55, 679.4, 679.58, 679.32, 679.31, 679.48

See application file for complete search history.

(56) References Cited

U.S. PATENT DOCUMENTS

| | | | | |
|---|---|---|---|---|
| 7,724,538 | B2 * | 5/2010 | Tsai et al. | 361/802 |
| 2009/0154119 | A1 * | 6/2009 | Chen et al. | 361/759 |
| 2009/0262508 | A1 * | 10/2009 | Fukui et al. | 361/759 |

* cited by examiner

*Primary Examiner* — Hung V Duong
(74) *Attorney, Agent, or Firm* — D. Austin Bonderer

(57) ABSTRACT

A mounting apparatus is configured for securing at least one PCI card, and includes a chassis, a bracket, a positioning member, and a locking member. The chassis includes a bottom plate and a side plate perpendicular to the bottom plate. The bracket is secured on the bottom plate. The positioning member is secured on the bracket. The positioning member includes a securing plate perpendicular to the chassis side pate and parallel to the chassis bottom plate. The locking member is secured on the securing plate of the positioning member. The locking member includes a limiting plate parallel to the securing plate. The at least one PCI card is located between the limiting plate and the securing plate to secure the PCI card(s) in the chassis.

19 Claims, 4 Drawing Sheets

MOUNTING APPARATUS AND COMPUTER SYSTEM FOR PCI CARD

BACKGROUND

1. Technical Field

The present disclosure relates to mounting apparatuses and computer systems, and particularly to a mounting apparatus and a computer system for securing a Peripheral Component Interconnect (PCI) card.

2. Description of Related Art

A PCI card typically includes cover plate and a connecting portion capable of electronically connecting with a motherboard of a computer system. In assembly the connecting portion of the PCI card is inserted in a socket of the motherboard, and the cover plate is secured on a chassis of the computer system by fasteners. The PCI card is thus secured in the computer system chassis. However, the PCI card cannot be stably secured in the computer system chassis with only the connecting portion and the cover plate of the PCI card providing support.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
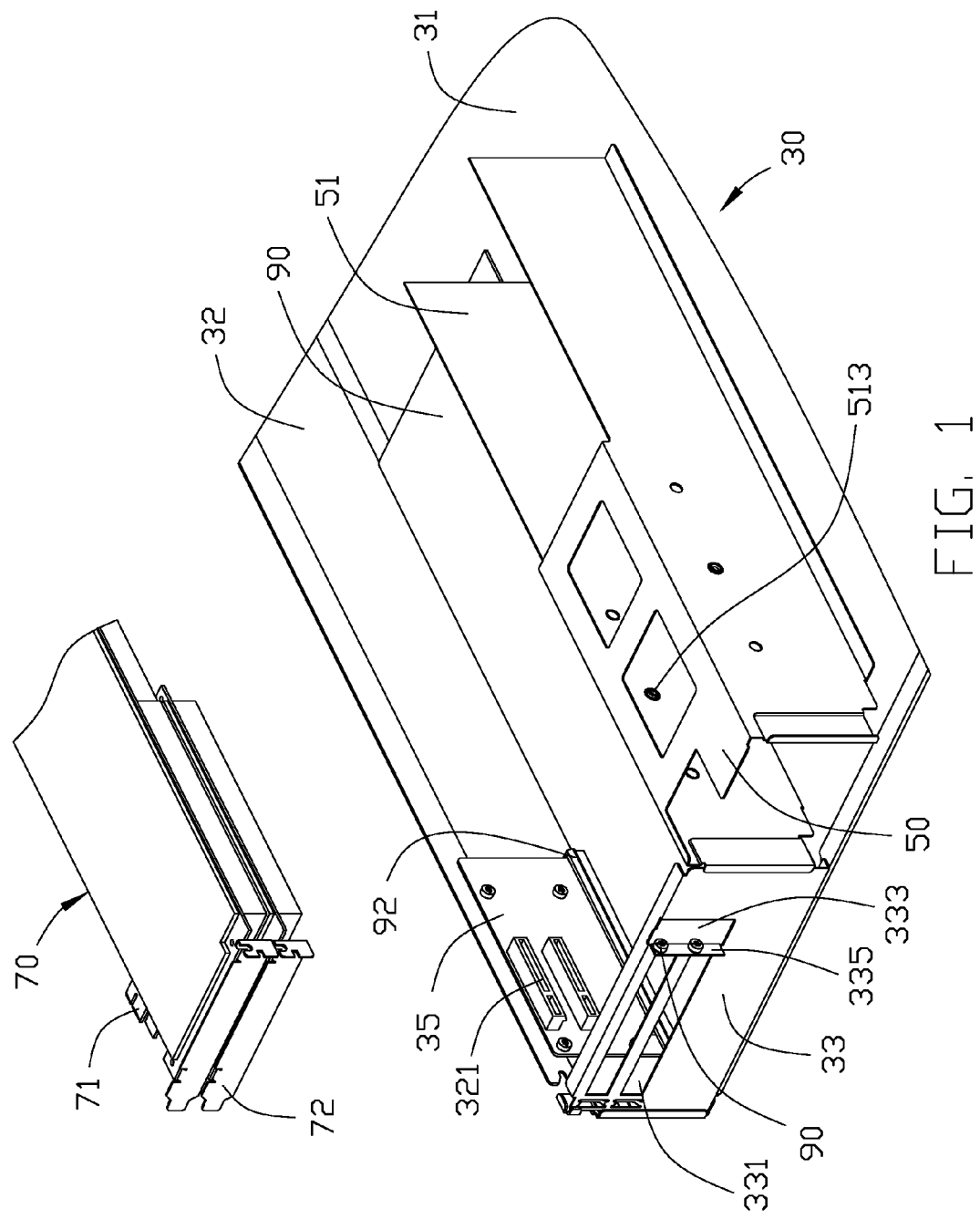
FIG. 1 is an isometric, exploded view of a computer chassis and PCI cards, in accordance with an embodiment.
Figure 2:
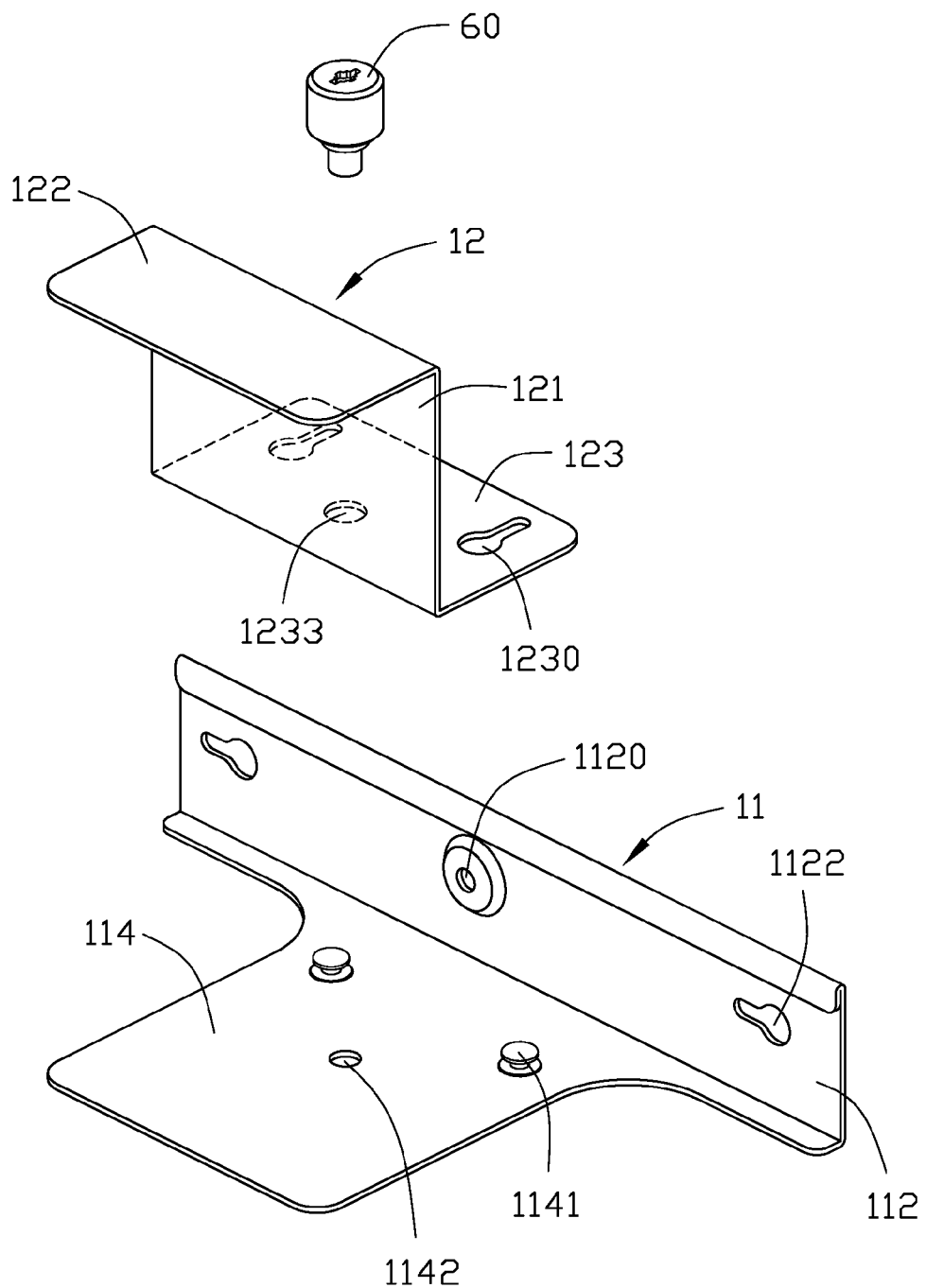
FIG. 2 is an isometric, exploded view of a positioning member and a locking member, in accordance with an embodiment.

Referring to FIGS. 1 and 2, a mounting apparatus in accordance with an embodiment is used to secure PCI cards 70. Each PCI card 70 includes a connecting portion 71 and a cover piece 72. The mounting apparatus includes a chassis 30, a positioning member 11, and a locking member 12.

The chassis 30 includes a bottom plate 31, a side plate 32 perpendicular to the bottom plate 31, and a front plate 33 both perpendicular to the bottom plate 31 and the side plate 32. A bracket 50 is secured on the bottom plate 31 and the front plate 33. The bracket 50 includes a sidewall 51 perpendicular to both the bottom plate 31 and the front plate 33 and separated from the side plate 32. Two fixing posts 511 (shown in FIG. 3) are located on a surface of the sidewall 51 facing the side plate 32. Each fixing post 511 includes a fixing head portion and a fixing neck portion with a diameter smaller that a diameter of the fixing head portion. A fixing hole 513 is defined in the sidewall 51 between the two fixing posts 511. A motherboard 90 with a PCI socket 92 is secured on the bottom plate 31 between the side plate 32 and the bracket sidewall 51. A riser card 35 is secured on the side plate 32, and has a portion electrically inserted in the motherboard PCI socket 92. Two riser card sockets 351 are located on the riser card 35, for receiving the connecting portions 71 of the PCI cards 70.

Two elongated horizontal slots 331 and a rectangular vertical slot 333 are defined in the front pate 22 adjacent the side plate 32. A bent piece 335 extends perpendicularly out from a vertical edge of the vertical slot 333 adjacent to the horizontal slots 331, and provides the cover piece 72 of the PCI cards 70 with support.

The positioning member 11 includes a positioning plate 112, and a securing plate 114 extending perpendicularly from the positioning plate 112. Two positioning holes 1122 are defined in the positioning plate 112 and are configured to receive the bracket fixing posts 511. Each positioning hole 1222 includes a circular positioning entry and an elongated positioning slot communicating with the circular positioning entry. The circular positioning entry has a diameter greater than the diameter of the fixing head portion of the fixing post 511. The elongated positioning slot has a width that is greater than the diameter of the fixing neck portion of the fixing post 511, but smaller than the diameter of the fixing head portion of the fixing post 511. A mounting hole 1120 is defined in the positioning plate 112 between the positioning holes 1122, corresponding to the bracket sidewall fixing hole 513. Two securing posts 1141 are located on the securing plate 114 adjacent the positioning plate 112, and a securing hole 1142 is defined in the securing plate 114. Each securing post 1141 includes a securing head portion, and a securing neck portion with a diameter smaller than a diameter of the securing head portion.

The locking member 12 is configured to secure on the positioning member 11, and includes a base plate 121, a limiting plate 122, and a locking plate 123. The limiting plate 122 is perpendicularly bent from an edge of the base plate 121 along a first direction. The locking plate 123 is perpendicularly bent from an opposite edge of the base plate 121 along a second direction, which reverses to the first direction. Two locking holes 1230 are defined in the locking plate 123 for receiving the securing posts 1141, and a latching hole 1233 is defined in the locking plate 123 between the locking holes 1230 corresponding to the securing hole 1142 of the positioning member 11. Each locking hole 1230 includes a circular entry and an elongated slot communicating with the circular entry. The circular entry has a diameter greater than the diameter of the securing head portion of the securing post 1141. The elongated slot has a width that is greater than the diameter of the locking neck portion of the securing post 1141, but smaller than the diameter of the locking head portion of the securing post 1141.

Figure 3:
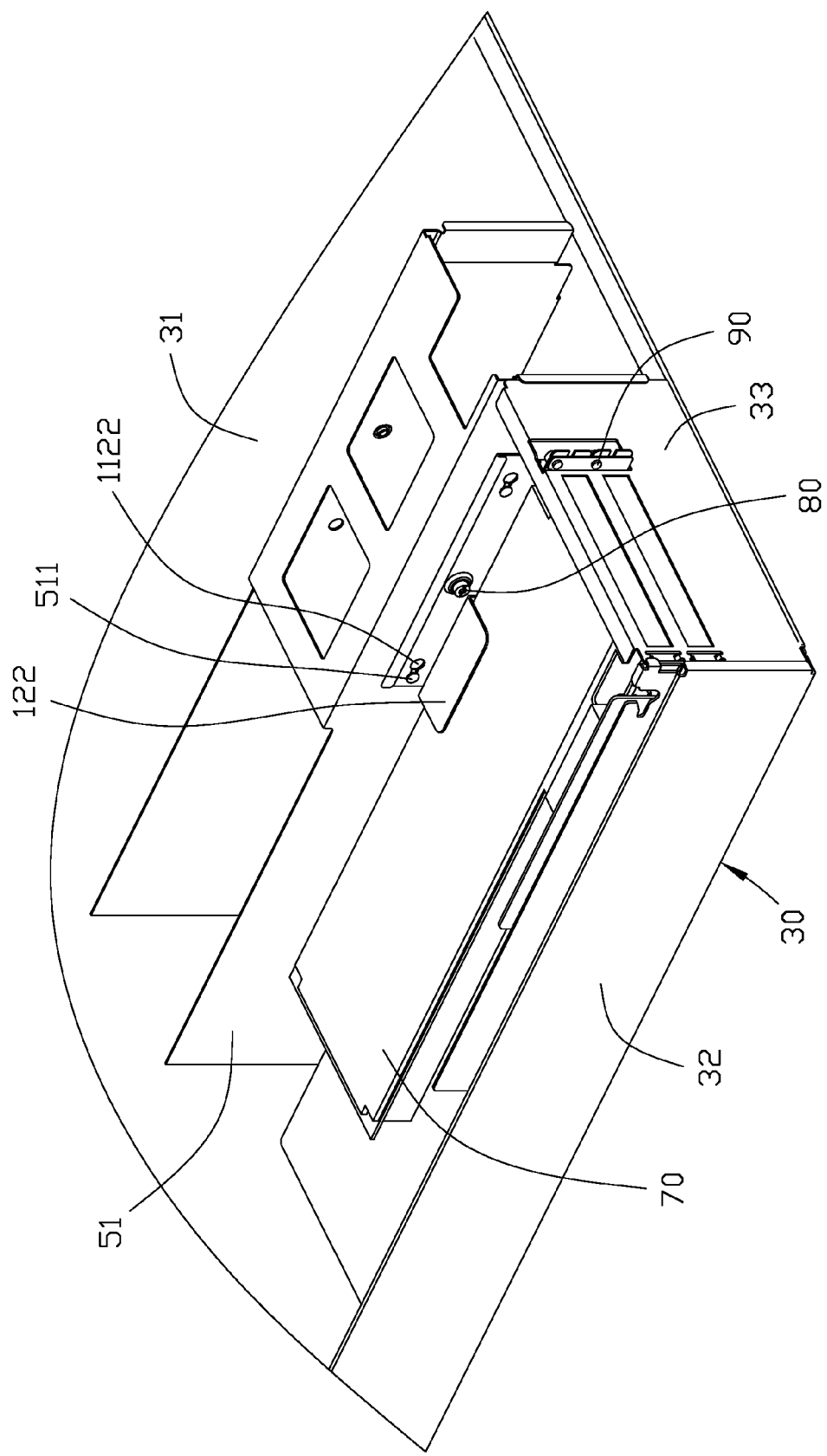
FIG. 3 is an assembled view of the computer chassis and PCI cards of FIG. 1 and the positioning member and the locking member of FIG. 2.
Figure 4:
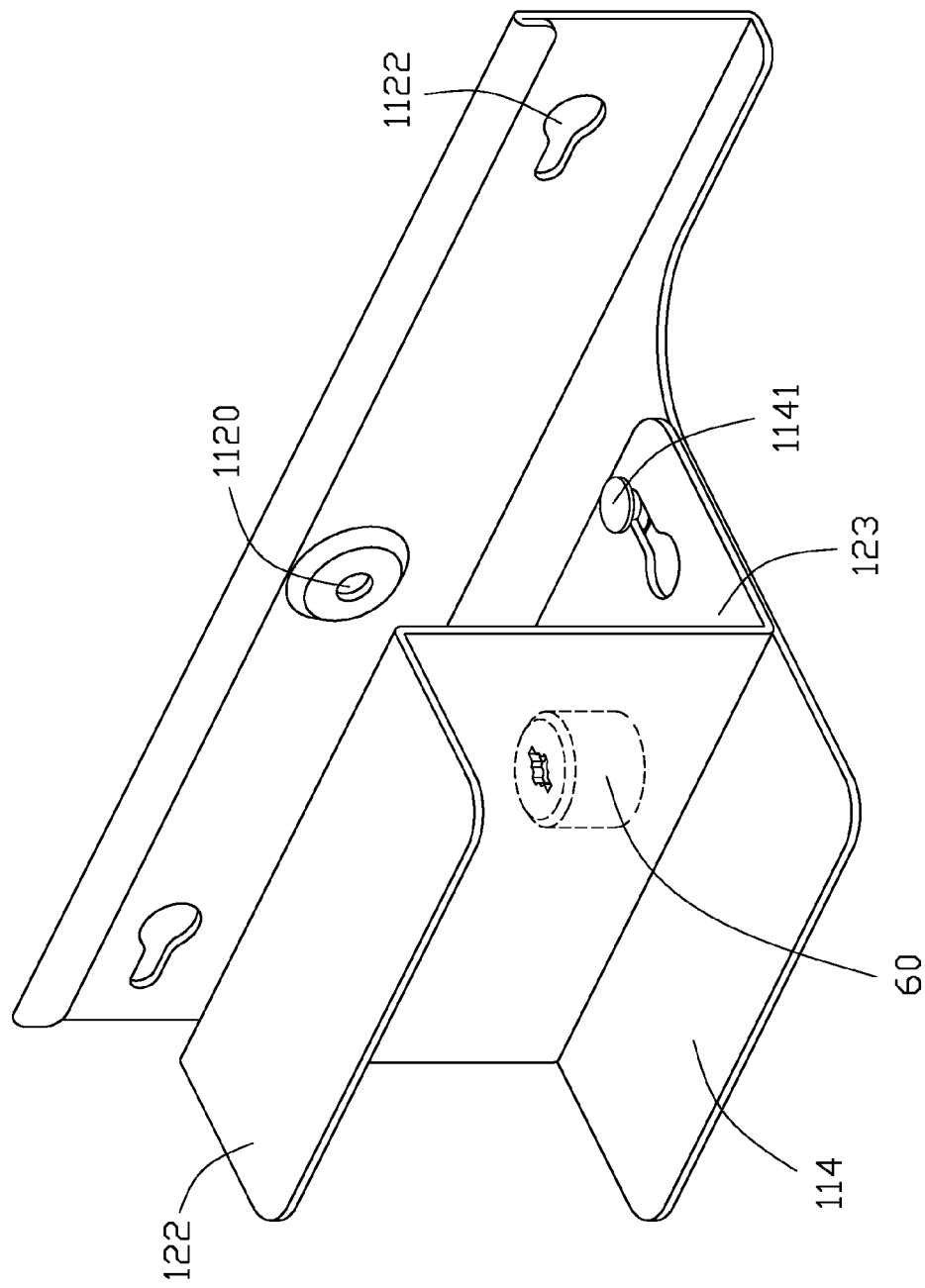
FIG. 4 is similar to the FIG. 3, but not showing the chassis and the PCI cards.

Referring also to FIGS. 3-4, the fixing posts 511 of the bracket 50 are inserted into the positioning entry of the positioning holes 1122 of the positioning member 11. The positioning member 11 is then slid to align the mounting hole 1120 with the fixing hole 513 of the bracket 50. The fixing neck portions of the fixing posts 511 are engaged in the positioning slots of the positioning holes 1122. A first fastener 80 is engaged in the mounting hole 1120 and the fixing hole 513, thereby fixing the positioning member 11 on the sidewall 41 of the bracket 50. The securing plate 114 of the positioning member 11 is parallel to the bottom plate 31 and perpendicular to the side plate 32.

The PCI cards 70 are then placed in the chassis 30 between the side plate 32 and the bracket sidewall 51, and located on the securing plate 114 of the positioning member 11. The connecting portions 71 are engaged in the riser card sockets 351. The cover pieces 72 cover the horizontal slots 331 and are supported on the bent piece 335 of the front plate 33. Two second fasteners 90 are used to fasten the cover pieces 72 to the bent piece 335, so as to secure the PCI cards 70 in the chassis 30. The locking member 12 is placed in the chassis 30 between the PCI cards 70 and the bracket sidewall 51. The locking plate 123 of the locking member 12 is located on the securing plate 114 of the positioning member 11, and the limiting plate 122 is located on one side of the PCI cards 70 so as together with the securing plate 114 to secure the PCI cards therebetween. The securing posts 1141 of the positioning member 11 are engaged in the circular entry of the locking holes 1230 of the locking member 12. The locking member 12 is then slid to align the latching hole 1233 with the securing hole 1142. The securing neck portions of the securing posts 1141 are engaged in the elongated slots of the locking holes 1230. A third fastener 60 is engaged in the latching holes 1233 and the securing hole 1142, so as to secure the locking member 12 on the positioning member 11. The PCI cards 70 are located between the limiting plate 122 of the locking member and the securing plate 114 of the positioning member 11, so that the PCI cards 70 are stably secured in the chassis 30.

In disassembly of the PCI cards 70, the third fastener 60 is disengaged from the latching hole 1233 and the securing hole 1142, so that the locking member 12 can be removed from the positioning member 11.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for securing at least one Peripheral Component Interconnect (PCI) card, the mounting apparatus comprising:
   a chassis comprising a bottom plate and a side plate perpendicular to the bottom plate;
   a bracket secured on the bottom plate;
   a positioning member secured on the bracket, the positioning member comprising a securing plate perpendicular to the chassis side plate and parallel to the chassis bottom plate; and
   a locking member secured on the securing plate of the positioning member, the locking member comprising a limiting plate parallel to the securing plate; wherein the at least one PCI card is located between the limiting plate and the securing plate.

2. The mounting apparatus of claim 1, wherein the locking member further comprises a base plate and a locking plate; the limiting plate is bent from an edge of the base plate in a first direction; the locking plate is bent from an opposite edge of the base plate in a second direction opposite to the first direction.

3. The mounting apparatus of claim 2, wherein the limiting plate and the locking plate are both perpendicular to the base plate.

4. The mounting apparatus of claim 2, wherein the locking plate defines a locking hole, and a securing post is located on the securing plate and engaged in the locking hole.

5. The mounting apparatus of claim 4, wherein the locking plate defines a latching hole; the securing plate defines a securing hole; and the latching hole and the securing hole receive a fastener therein to secure the locking plate on the securing plate.

6. The mounting apparatus of claim 1, wherein the positioning member further comprises a positioning plate extending from the securing plate; the bracket comprises a sidewall; and the securing plate is secured on the bracket sidewall.

7. The mounting apparatus of claim 6, wherein the positioning plate is perpendicular to the securing plate.

8. The mounting apparatus of claim 6, wherein the positioning plate of the positioning member defines a positioning hole; a fixing post is located on the bracket sidewall and engaged in the positioning hole to locate the positioning member on the bracket sidewall.

9. The mounting apparatus of claim 6, wherein the positioning plate of the positioning member defines a mounting hole; the bracket sidewall defines a fixing hole; and the mounting hole and the fixing hole receive a second fastener, so as to secure the positioning member on the bracket sidewall.

10. A computer system comprising:
    a chassis comprising a bottom plate and a side plate perpendicular to the bottom plate, a circuit board being secured on the side plate and parallel to the side plate;
    a bracket secured on the bottom plate and separated from the chassis side plate, the bracket comprising a sidewall parallel to the chassis side plate;
    a positioning member secured on the bracket sidewall;
    at least one PCI card secured in the chassis between the chassis side plate and the bracket sidewall, the at least one PCI card being perpendicular to the circuit board and located on the positioning member; and
    a locking member secured on the positioning member, so that the locking member together with the positioning member locates the at least one PCI card therebetween.

11. The computer system of claim 10, wherein the positioning member comprises a securing plate perpendicular to the chassis side plate and parallel to the chassis bottom plate.

12. The computer system of claim 11, wherein the locking member is secured on the securing plate, and comprises a limiting plate parallel to the securing plate; the at least one PCI card is located between the limiting plate and the securing plate.

13. The computer system of claim 12, wherein the locking member further comprises a base plate and a locking plate; the limiting plate is bent from an edge of the base plate in a first direction; the locking plate is bent from an opposite edge of the base plate in a second direction opposite to the first direction.

14. The computer system of claim 13, wherein the limiting plate and the locking plate are both perpendicular to the base plate.

15. The computer system of claim 13, wherein the locking plate defines a locking hole; the securing post is located on the securing plate and engaged in the locking hole of the locking plate.

16. The computer system of claim 15, wherein the locking plate defines a latching hole; the securing plate of the positioning member defines a securing hole; the latching hole and the securing hole receive a fastener therein to secure the locking plate on the securing plate.

17. The computer system of claim 11, wherein the positioning member further comprises a positioning plate extending from the securing plate; the securing plate is secured on the bracket sidewall.

18. The computer system of claim 17, wherein the positioning plate is perpendicular to the securing plate.

19. The computer system of claim 17, wherein the positioning plate defines a positioning hole; a fixing post is located on the bracket sidewall and engaged in the positioning hole to secure the positioning member on the bracket sidewall.

* * * * *